Patented Apr. 2, 1935

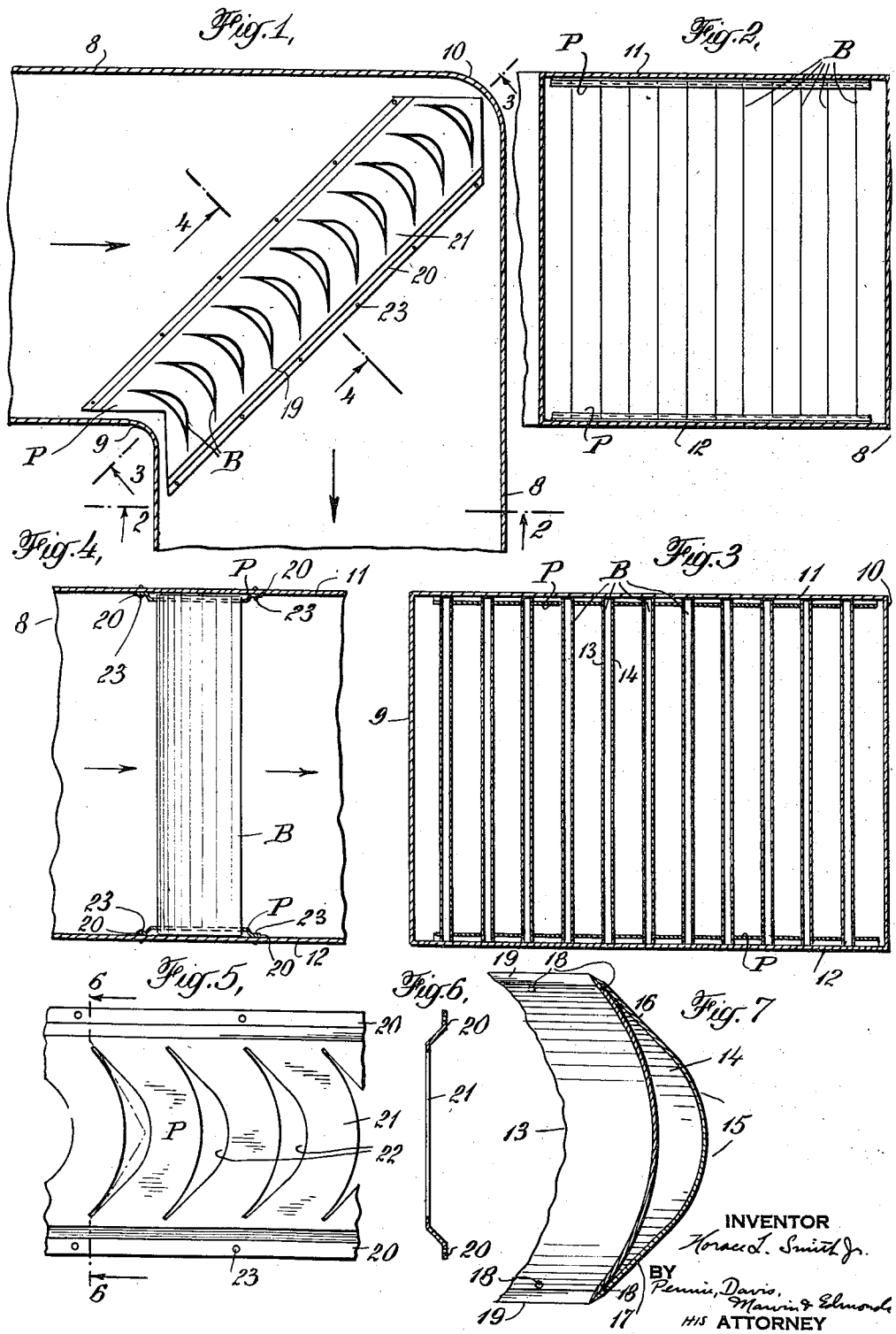

1,996,596

UNITED STATES PATENT OFFICE 1,996,596

FLUID DUCT

Horace L. Smith, Jr., Richmond, Va., assignor to Thermal Engineering Corporation, Richmond, Va., a corporation of Virginia Application October 25, 1934, Serial No. 749,910

9 Claims. (Cl. 137—112)

This invention relates to fluid ducts and more particularly concerns improvements in ducts of the type employed to distribute air through buildings or other structures for cooling, heating or conditioning purposes.

In constructing ducts for conducting various fluids, such as conditioned air, from a central source to building rooms or other points of comsumption, it has been found that serious losses of velocity pressure occur at the elbows or bends of the ducts. These losses are caused by the air turbulence set up in sharp elbows or corners and although some improvement is obtainable by using curved elbows, it is necessary to employ curves of considerable radius if any material improvement is to be obtained. Curved elbows of large radius not only occupy considerable space and interfere with the usual rectangular arrangement of building walls, floors and ceilings, but the cost of such elbows is excessive since the fabrication of curved duct sections from sheet metal or other sheet material is a laborius procedure requiring the services of skilled artisans.

It has been proposed to reduce noise and velocity pressure losses in angular fluid duct elbows by employing a series of curved blades or air splitters to reduce the air turbulence therein. These blades are disposed in parallel relation transversely of the duct and are substantially aligned along a plane bisecting the plane of the elbow. Although they considerably reduce the velocity pressure losses, known types of elbow blades or air splitters are unsatisfactory in many respects. These blades are customarily made of sheet metal and are often bent or distorted in manufacture, transportation or assembly in the duct structure. Bent or distorted blades cause air turbulence in the ducts and increase rather than reduce velocity pressure losses at the elbows. A further objection to known sheet metal blades is that they do not reduce the losses resulting from the successive expansion and contraction of the fluid as it passes through an angular elbow. The cross section of the duct along a plane bisecting the angle of an elbow is necessarily considerably greater than the cross section of the straight duct sections on either side of the elbow, and consequently the air or other fluid expands as it reaches the eblow and must be recompressed as it enters the straight duct sections leading from the elbow.

With the above and other considerations in mind, it is proposed in accordance with the present invention to provide an improved form of air deflecting and velocity pressure loss reducing blade construction for angular fluid duct elbows, which blade construction not only reduces fluid turbulence by directing the fluid in curved streams around the elbow but further reduces velocity pressure losses by providing an air duct of constant cross section throughout the elbow and thereby preventing the successive expansion and compression of the fluid as it flows through the elbow. A further object of the invention is the provision of a blade construction of a type which, although very inexpensive to manufacture, is strong and rigid and accordingly is not likely to be bent or distorted during manufacture or during assembly in the duct elbow. The objects of the invention also include the provision of improved and simplified supporting mean for the elbow blade construction, which means accurately position the blades in the duct elbow. Other objects, advantages and characteristic features of the invention will become apparent as the description thereof progresses.

In general, the objects of the invention are carried out by providing air deflecting blades each comprising two elongated members of curved section formed of sheet material. The two members of each blade are disposed in nested relationship and connected together along their longitudinal side edges. The two nested members have sections of different curvature so that they are spaced apart between their meeting connected side edges. A series of these blades, disposed in parallel spaced relation, is disposed along a plane bisecting the angle of a fluid duct elbow. With this arrangement, the series of blades extends across the duct from the inner corner of the elbow to the outer corner thereof, each blade extending across the duct between its opposite plane walls. The blade members are preferably formed of sheet metal and are welded together along their side edges.

In accordance with one embodiment of the invention, the blades are supported and secured to the plane duct walls by means of plates having raised portions provided with parallel curved openings of the same size and shape as the sections of the blades. Two of these plates are respectively secured within the duct elbow on the opposite plane walls thereof and are disposed along a line bisecting the angle of the elbow. The opposite ends of the blades are respectively disposed in aligned openings of the two plates and the blades are securely supported in the desired positions across the elbow of the duct.

The invention will be best understood by reference to the accompanying drawing, in which a preferred embodiment thereof has been illustrated. In the drawing:

Figure 1 is a plan view of a duct elbow provided with a blade construction embodying the invention, the upper wall of the duct being removed to show the interior construction;

Figure 2 is a sectional view taken along the line 2—2 of Figure 1 and viewed in the direction of the arrows;

Figure 3 is a sectional view taken along the line 3—3 of Figure 1 and viewed in the direction of the arrows;

Figure 4 is a sectional view taken along the line 4—4 of Figure 1 and viewed in the direction of the arrows;

Figure 5 is an enlarged plan view of one of the blade supporting plates;

Figure 6 is a sectional view of a blade supporting plate taken along the line 6—6 of Figure 5; and Figure 7 is an enlarged perspective view of a section of one of the blades.

Referring to the drawing, a fluid duct 8 of rectangular section is shown in Figure 1. This duct is provided with an elbow which as shown forms a right angle with the longitudinal sections of the duct. Extending across the duct elbow is a series of spaced parallel curved air deflecting blades B. The series of blades is substantially aligned as shown with a plane bisecting the angle of the duct elbow, so that the blade series extends from the inner corner 9 to the outer corner 10 of the elbow. Each blade B extends across the duct from the upper plane wall 11 to the lower plane wall 12 thereof, as shown in Figures 2, 3 and 4.

In accordance with the invention, each blade B is formed of two elongated members 13 and 14 of curved section, preferably composed of sheet metal, as best shown in Figure 7. The blade members 13 and 14 are of different curvature, the inner member 13 having a curvature of larger radius than the curvature of the outer member 14. With this arrangement, when the members are disposed in nested relation with their longitudinal side edges aligned, their central portions are spaced apart a considerable amount. In one form of the invention, the outer member 14 has a central radially curved portion 15 and plane edge portions 16 and 17 tangent to the curvature of the central portion 15. The blade members 13 and 14 are connected along their side edges by suitable means such as spot welding, seam welding or soldering. In the disclosed embodiment, this connection is made by spot welding, as indicated at 18 in Figure 7. The united side edges of the blade members 13 and 14 are preferably tapered to form a sharp blade edge as shown at 19.

The blade members 13 and 14 are preferably so curved and spaced apart that the completed blades B, when disposed in spaced parallel relation, as shown in Figure 1, form fluid passages of substantially uniform cross section around the duct elbow. Thus the total cross section of the spaces between the blades B, as shown in Figure 3, is equal to the total cross section of the duct 8 adjacent the elbow, as shown in Figure 2. With this arrangement, fluid turbulence and consequent loss of velocity pressure due to the successive expansion and compression of the fluid as it travels around the elbow is effectively prevented.

Various means may be employed to support the blades B in the duct elbow. In accordance with one embodiment of my invention, improved supporting plates are provided for this purpose. As shown in Figures 1, 4 and 5, two spaced parallel supporting plates P are provided to carry the blades B. Each plate P comprises marginal flanges 20 with a central raised portion 21 therebetween. A series of spaced parallel openings 22 are formed in the central raised portion of each plate P, these openings being of a size conforming to the cross section of the blades B.

The plates P are respectively secured across the elbow along the opposite plane duct walls 11 and 12 and extend from the inner corner 9 to the outer corner 10 of the elbow, as shown in Figure 1. The plates P may be fastened to the duct walls by any suitable means such as the rivets 23. The opposite ends of each plate may be cut to conform with the duct elbow corners, as shown in Figure 1.

The opposite ends of each blade B are inserted in aligned openings 22 in the plates P, and the blades are thereby rigidly secured in the desired spaced parallel relation across the duct elbow. The raised central portions 21 of the plates P form shoulders which securely support the blades B against lateral movement.

The blade construction of the invention provides a very simple, inexpensive and easily installed means for preventing undue loss of velocity pressure in fluid duct elbows. The formation of the blades from two curved section sheet metal members results in a very strong and rigid construction and prevents accidental bending or distortion of the blades during assembly of the duct work. Further, this construction is readily adaptable to elbows of different angles since the curvature of the blade surfaces may be readily altered without extensive changes in the blade manufacturing procedure.

I claim:

1. The combination with a fluid duct comprising two straight sections meeting at an angular elbow, the cross sectional area of the duct in a plane bisecting the angle of the elbow being greater than the cross sectional area of said straight sections, of a series of spaced parallel elongated blades substantially aligned along a plane bisecting the angle of the elbow, each of said blades extending lengthwise across said duct and comprising two elongated members of curved section connected together along their longitudinal edges and spaced apart between said edges.

2. The combination with a fluid duct comprising two straight sections meeting at an angular elbow, the cross sectional area of the duct in a plane bisecting the angle of the elbow being greater than the cross sectional area of said straight sections, of a series of spaced parallel elongated blades substantially aligned along a plane bisecting the angle of the elbow, each of said blades extending lengthwise across said duct and comprising two nested elongated members of differently curved section connected together along their opposite side edges and spaced apart between said edges by an amount sufficient to provide a duct of substantially uniform cross sectional area around said elbow between said blades.

3. The combination with a fluid duct comprising two straight sections meeting at an angular elbow, the cross sectional area of the duct in a plane bisecting the angle of the elbow being greater than the cross sectional area of said straight sections, of a series of spaced parallel elongated blades substantially aligned along a plane bisecting the angle of the elbow, each of said blades extending lengthwise across said duct and comprising a pair of elongated sheet metal members having curved sections of different radius welded together along their opposite side edges and spaced apart between said edges by an amount sufficient to provide a curved duct of substantially uniform cross sectional area between each adjacent pair of blades.

4. The combination with a rectangular fluid duct and an angular elbow in said duct, of a plate disposed within said duct along one surface thereof and extending from the inner corner to the outer corner of said elbow, said plate having a raised portion with spaced parallel openings therein and a plurality of elongated air deflecting blades extending across said duct at said elbow, each of said blades having one end disposed in one of said openings in the raised portion of said plate, whereby said blades are supported in spaced parallel aligned relation across said duct elbow by said plate.

5. The combination with a rectangular fluid duct and an angular elbow in said duct, of a pair of parallel elongated plates disposed within said duct along opposite walls thereof, and each extending across said duct from the inner corner of said elbow to the outer corner of said elbow, each of said plates having a raised central portion with curved spaced parallel openings therein, and a plurality of elongated air deflecting blades of curved section extending transversely across said duct at said elbow, each of said blades having its opposite ends disposed in said openings in said respective plates, whereby said blades are supported in spaced parallel aligned relation across said duct elbow by said plates.

6. An air deflecting blade for fluid duct elbows comprising a pair of elongated members formed of sheet material and having curved sections of different radius and means connecting said members along their opposite longitudinal edges whereby the central portions of said members are spaced apart.

7. An air deflecting blade for fluid duct elbows comprising a pair of elongated sheet metal members of differently curved sections disposed in nested relationship and a welded joint connecting said members along their opposite longitudinal side edges, the difference in curvature between said members being sufficient to space said members apart adjacent their central portions.

8. An air deflecting blade for fluid duct elbows comprising an elongated outer member of sheet material having a curved section, an elongated inner member of sheet material having a curved section of longer radius than said outer member and disposed in nested relation to said outer member, and means connecting said members along their opposite longitudinal side edges.

9. An air deflecting blade for fluid duct elbows comprising an elongated outer member of sheet material having a curved central portion and plane edge portions tangent to said central portion, an elongated inner member of sheet material having a curved section and disposed in nesting relation to said outer member, and means for connecting said members along their opposite side edges.

HORACE L. SMITH, Jr.